Dec. 15, 1959           A. HENDERSON           2,917,015
ASSEMBLY TABLE FOR WELDING REINFORCING STEEL
CAGES FOR CONCRETE STRUCTURAL SHAPES

Filed June 13, 1955           3 Sheets-Sheet 2

INVENTOR.
ALBERT HENDERSON.
BY Archworth Martin
his ATTORNEY

Dec. 15, 1959 A. HENDERSON 2,917,015
ASSEMBLY TABLE FOR WELDING REINFORCING STEEL
CAGES FOR CONCRETE STRUCTURAL SHAPES
Filed June 13, 1955 3 Sheets-Sheet 3
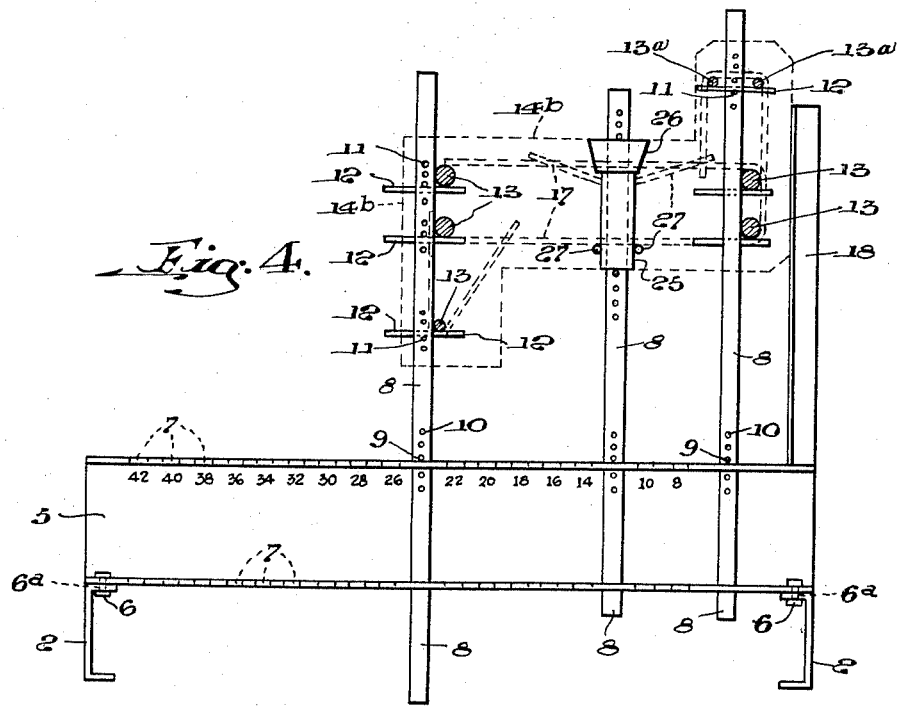
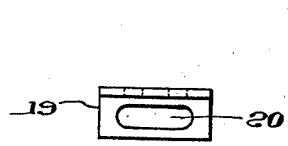
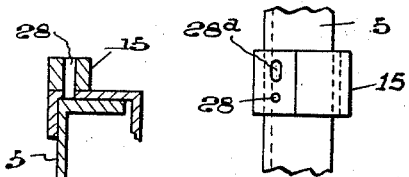
Fig. 5. Fig. 6. Fig. 7.
Fig. 10.
Fig. 9.
Fig. 8.
INVENTOR.
ALBERT HENDERSON.
BY Archworth Martin
his ATTORNEY.

United States Patent Office 2,917,015
Patented Dec. 15, 1959

2,917,015

ASSEMBLY TABLE FOR WELDING REINFORCING STEEL CAGES FOR CONCRETE STRUCTURAL SHAPES

Albert Henderson, Pittsburgh, Pa.

Application June 13, 1955, Serial No. 515,029

5 Claims. (Cl. 113—99)

One object of my invention is to provide an accurate and quick method and means for assembling and welding reinforcing steel in the form of cages for use in this manner that the pipes are welded accurately and quickly reinforced concrete framing shapes that are fully described and claimed in my pending application entitled Precast Reinforced Concrete Structural Shapes and Assemblies, Serial No. 470,674, filed November 23, 1954, now abandoned.

Another object of this invention is to position steel pipe lengths with respect to these reinforcing cages in such manner that the pipes are welded accurately and quickly to the reinforcing steel cages.

The reinforced concrete structural shapes are made in four inch variations in widths and in two inch variations in depths, and their reinforcing cages also vary in widths by four inches and also vary in depths by two inches. The primary reinforcing steel bars are in either single or double layers. The distance between the bars of a double layer is one inch. The center-to-center distance between the outside primary reinforcing bars is three inches for the second narrowest shape and, allowing 2½" to the centers of the outside primary bars at the nearest sides of the shape, makes the total width of the shape eight inches. The next wider shape has a distance of seven inches from center-to-center of the outside primary reinforcing bars and eleven inches center-to-center of the outside primary reinforcing bars. The distance between outside primary reinforcing bars of the wider shapes all vary by four inch increments. The narrowest shape is four inches wide and has only one primary reinforcing bar, the next width is eight inches and has two primary reinforcing bars, the next wider shape is twelve inches wide and has three primary reinforcing bars in a single row. The next wider shape is sixteen inches wide and has four primary reinforcing bars in a single row.

When all of the shapes of different widths are superposed on a common center-line, the single bar in the four inch width coincides in plane with the middle distance between the two bars in the eight inch width. The two bars in the eight inch width substantially coincide in plane with the middle distances between the three bars in the twelve inch width, and the three bars in the twelve inch width substantially coincide with the middle distances between the four bars on the sixteen inch width. This relation between the bars of the series of shapes allows primary bars of one size to pass between the bars of the next wider shape, so that pipes welded to and between or to and at the ends of the reinforcing bars can receive the bars extending from one shape of the next width; or if welded to the ends of the bars, other bars projecting from a shape of the same width can enter the pipes centrally.

As shown in the accompanying drawings, Figure 1 shows a side view of the assembly table;

Fig. 4 shows a modified cross section of the assembly table;

Fig. 5 shows a plan view of the pipe spacer angle;

Fig. 6 shows a sectional view of spacer holder;

Fig. 7 shows a plan view of spacer holder;

Fig. 8 shows a plan view of chair spacer;

Fig. 9 shows a plan view of straight spacer; and

Fig. 10 shows a plan view of reinforcing stirrup or tie.

Figure 1:
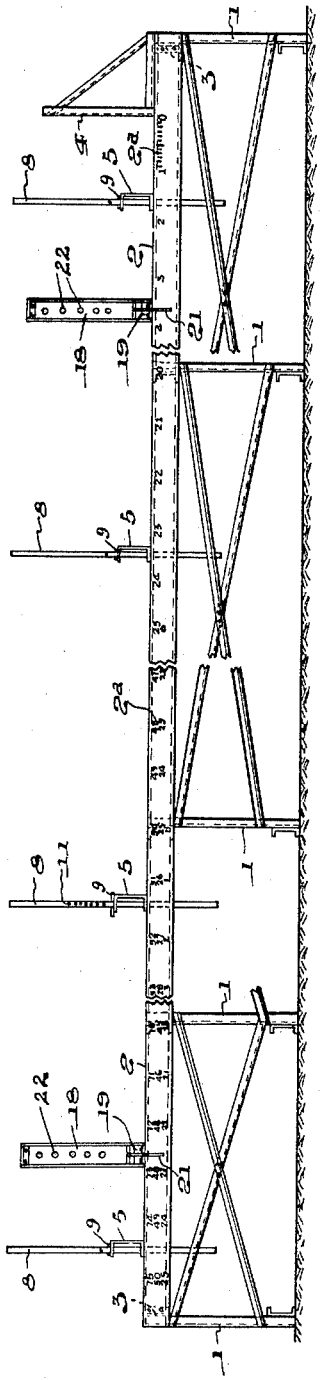

Referring in detail to Figs 1 to 4, the frame comprises legs 1, longitudinal channels 2, and cross channels 3, which are all bolted together. One of the channels 2 has a measuring scale 2a marked thereon. The scale is in feet, inches and fractions thereof. An end stop member 4 has a surface in the same plane as zero on the scale 2a. One end of the reinforcing steel cages to be formed on the table abut the end stop member 4. Channels 5 are adjustably bolted to the top flanges of the channels 2, by bolts 6 that extend through holes 6a in the channels 2. The holes 6a are ½" diameter and are spaced on one inch centers all along the top flanges of channels 2, and the first ½" hole 6a centers on zero, on the scale 2a. The channels 5 have 1" diameter holes 7 spaced on 2" centers along top and bottom flanges of the channel 5. Adjustable reinforcing bar holders 8 are each 1" in diameter and pass through these holes 7 and are held at the proper position by pins 9 in holes 10. Pins 9 are ¼" in diameter, and the holes 10, which are slightly larger than ¼" diameter, are spaced on ½" centers. Holes 10 may also be provided in the holders 8, at right angles to the first-named holes in these holders. Upper ¼" holes 11 in the holders 8 are spaced on ½" centers, and these holes are placed in holders 8 at right angles to the first-mentioned holes in the holders 8.

Figure 2:
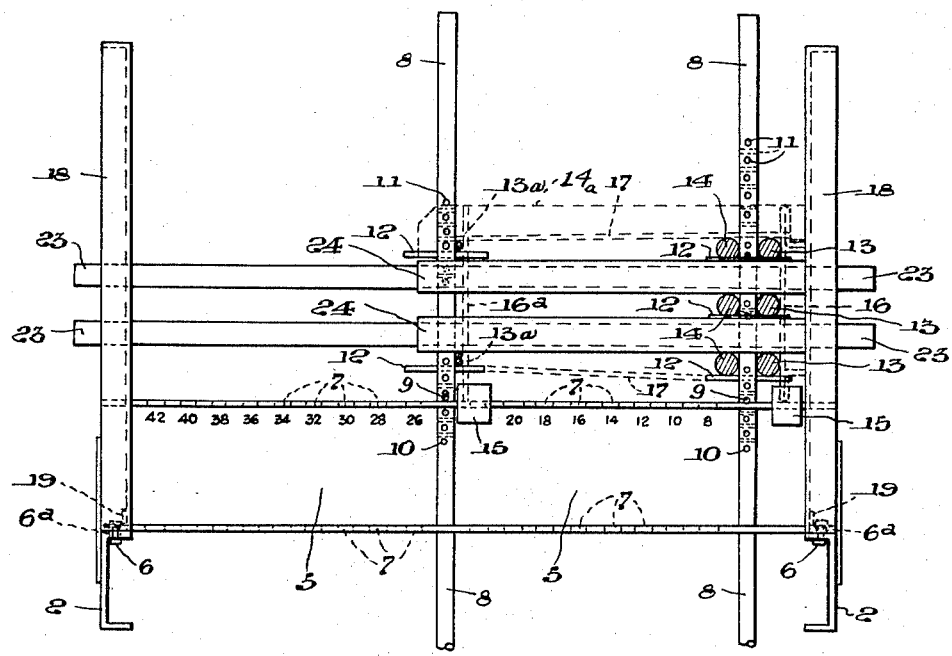
Fig. 2 shows an end view of the assembly table.

The spacing of these holes as shown permits variations of ¼" in elevations of the holders 8. The ¼" diameter pins 12 support reinforcing bars 13, 13a and 14. An upper layer of the reinforcing bars 14 are spaced apart by the holders 8. The distance between the lower bars 13 and upper bars 14 is one inch and the center-to-center bar spacing between the layers is two inches. In Fig. 2, dotted lines 14a show the position of the reinforcement in a concrete shape of my said application, and the dotted lines in Fig. 4 show the position in a Z shape in a lying-down position shape 14b. Spacer holders 15 are removably supported by the channels 5. Spacers 16 and 16a rest in spacer holders 15. Stirrups 17 are welded to the bars 13 and also to the bars 14, if there are double layers.

Figure 3:
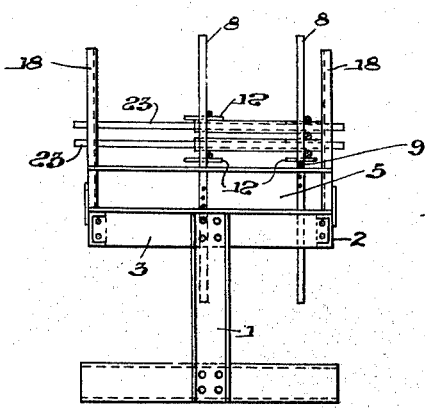
Fig. 3 shows a cross sectional view of the assembly table.

After the spacers 16 and 16a and the stirrups 17 are welded to the bars 13, the holders 8 are given a one-quarter turn so that the cage, when suspended for its removal, can pass the pins 12 (see Fig. 3). Adjustable pipe supports 18 rest on the channels 2 and are bolted through holes 6a in the tops flanges of the channels 2. The supports 18 have angles 19 secured thereto, and each angle 19 has a slot 20 through which ½" bolts 6 pass. A pointer 21 attached to the supports 18 will be moved along the scale 2a and can be used to position the supports 18 to an ⅛" exactitude. The ½" holes 6a are spaced every one inch and use of the slot 20 allows of spotting the supports 18 to an exact position. Vertically-spaced holes 22 carry pipe holders 23 which pass through steel pipes 24 and the holes in the supports 18. After the pipes 24 are welded to the cages, the holders 23 are withdrawn.

The spacing of the holes 22 is as follows: The center-to-center spacing of the two bottom holes is 3", and the center-to-center spacing of the lowermost holes and the third holes about is 7". The center-to-center spacing of the bottom holes to the fourth hole above is 11". This varies by 4" increments. The distance between the bottom hole center in supports 18 to the top of the channels 5 is 2½". This allows for proper fireproofing material around the reinforcing steel cages. The distance between the center of reinforcing bars 13 and the inside faces of support 18 is 2½". This also allows for enough fireproofing at the bottom side of the reinforcing steel cages. These two 2½" distances are always constant, and the top of the channel 5 and inside face of support 18 constitute a base line "zero" for the spacers 16 and 16a of the reinforcing steel cages. When the pipes 24 are positioned, they are welded to bars 13 and 14. The lower sides of the shapes are all flush with the top of the channel 5, and the bottoms of the shapes are all flush with the inside face of the support 18.

In Fig. 4, one of the bar holders 8 is shown supporting a steel pipe 25, and a removable recess-forming member 26. Steel ties 27 are welded to the pipe 25, and the stirrups 17.

Figs. 6 and 7 show a spacer holder 15 resting on the channel 5, and having a round hole 28 for supporting one of the straight spacers 16a and also having a slotted hole 28a for one of the chair spacers 16.

Figs. 8 and 9 are detail views of one of the chair spacers 16 and a straight spacer 16a. These spacers are made from ¼" diameter rustless metal rods and vary in lengths by 4" increments, the smallest being 4", and Fig. 10 is a fragmentary view of one of the stirrups 17. The hooks may be omitted, since they are welded to the rods 13. The spacers 16 and 16a are welded to the reinforcing bars 13 every five feet therealong, and the spacers 16 keep the bars 13 at the proper distance from the bottom of the concrete shape.

I claim as my invention:

1. An assembly table for welding reinforcing cages for use in concrete structural shapes, that comprises a horizontal base frame, rows of vertically extending holders carried by the frame, that are respectively rotatable on their vertical axes and are spaced apart in longitudinal and transverse directions, and horizontal pins at vertically spaced points on said holders in position to releasably support cage members from beneath, in horizontal positions at a plurality of vertically spaced planes during welding of other cage members thereto, the pins being of such short length relative to the spacing of the cage members as to be disengageable from beneath the cage members through rotation of the holders and to permit vertical removal of the cage members from between the holders.

2. A table as recited in claim 1, wherein horizontal pipe-supporting members are movably carried by other vertically-extending supports in position to enter into pipes and hold them during welding of cage members thereto.

3. A table as recited in claim 1, wherein pipe-supporting members are carried by other vertical holders and are movable horizontally through these holders into position to enter and support pipes at a plane between the pins that support the vertically spaced cage members during welding of the cage members to the pipe.

4. A table as recited in claim 1, wherein horizontally spaced spacer holders are adjustably mounted on the base frame, in position to support vertical cage members in crossed relation to the first-named cage members.

5. A table as recited in claim 1, wherein the pins are vertically adjustable relative to one another.

References Cited in the file of this patent

UNITED STATES PATENTS

| | | |
|---|---|---|
| 1,303,596 | Rifflard | May 13, 1919 |
| 1,471,909 | Miller | Oct. 23, 1923 |
| 1,949,007 | Butler | Feb. 27, 1934 |
| 2,212,421 | Henderson | Aug. 20, 1940 |
| 2,537,350 | Hunt | Jan. 9, 1951 |
| 2,774,134 | Smith et al. | Dec. 18, 1956 |